No. 811,112. PATENTED JAN. 30, 1906.
E. A. WHEELER & W. HECKERT.
W. W. SHILLING, EXECUTOR OF E. A. WHEELER, DEC'D.
AUTOMOBILE WHEEL.
APPLICATION FILED DEC. 29, 1904.
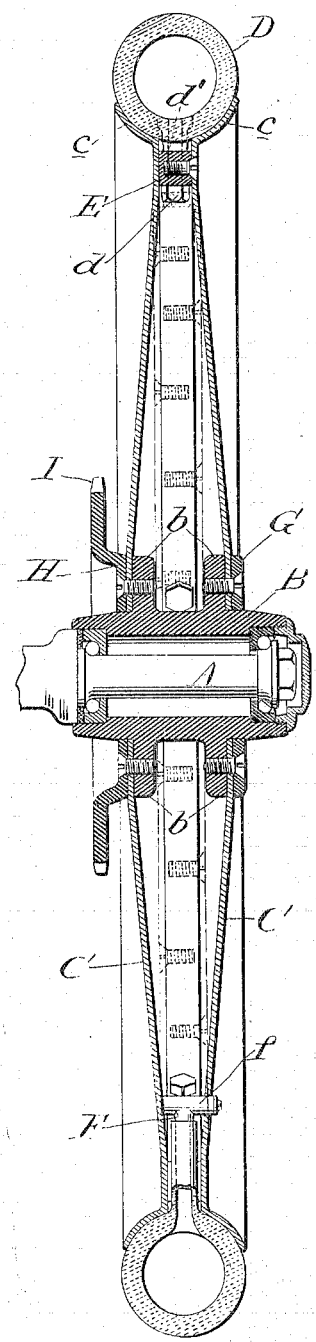
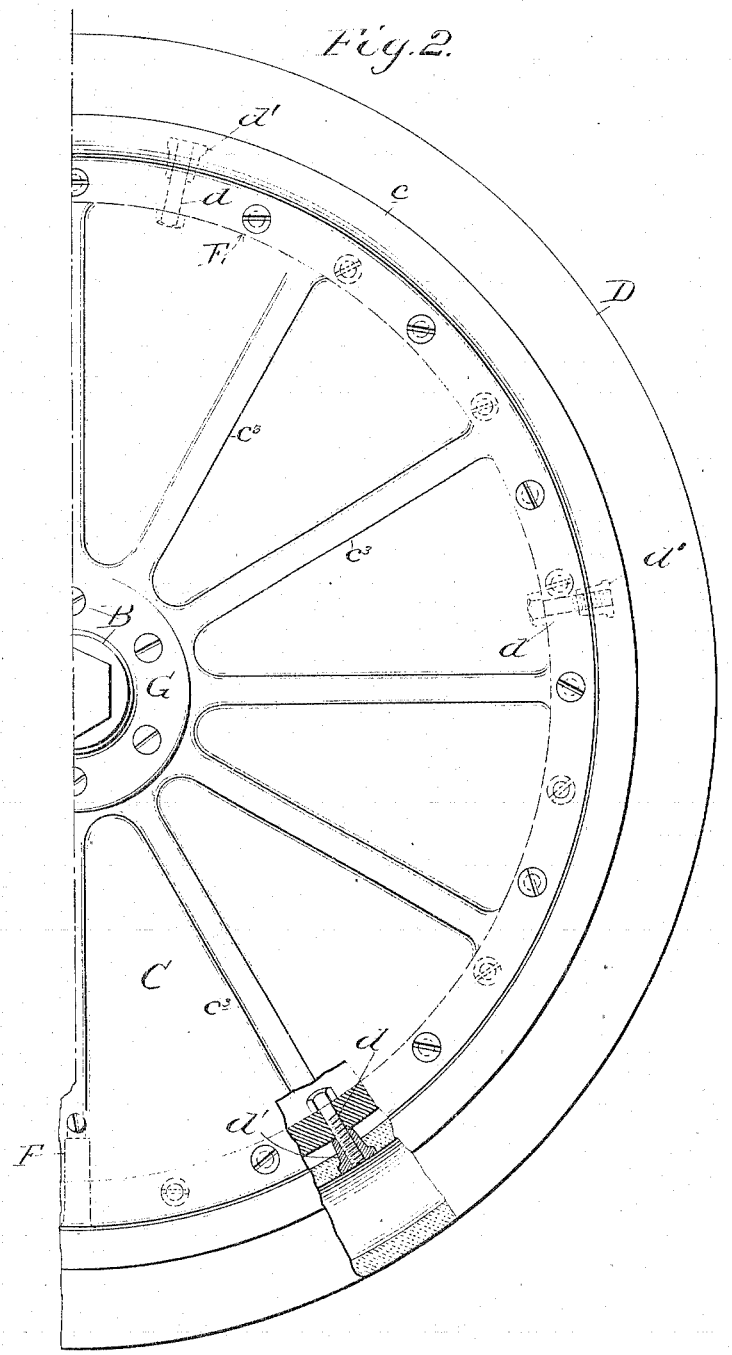

UNITED STATES PATENT OFFICE.

EARL A. WHEELER AND WILLIAM HECKERT, OF SHARON, PENNSYLVANIA; W. W. SHILLING EXECUTOR OF SAID EARL A. WHEELER, DECEASED.

AUTOMOBILE-WHEEL.

No. 811,112.   Specification of Letters Patent.   Patented Jan. 30, 1906.

Application filed December 29, 1904. Serial No. 238,766.

*To all whom it may concern:*

Be it known that we, EARL A. WHEELER and WILLIAM HECKERT, citizens of the United States, residing at Sharon, in the county of Mercer and State of Pennsylvania, have jointly invented certain new and useful Improvements in Automobile-Wheels; and we do hereby declare the following to be a full, clear, and exact description of the invention, such as will enable others skilled in the art to which it appertains to make and use the same.

This invention consists of an improved wheel designed particularly for automobiles or motor-vehicles, but also generally adapted for cycles, carriages, and wagons and vehicles of all descriptions employing rubber, cushion, pneumatic, or other flexible tires. Its chief distinguishing feature is the construction of the wheel so as to provide separable half-rims, which together constitute the complete grooved rim for reception of the tight-fitting tube, these half-rims being secured to an interposed ring, to which the tire is also attached by fastenings engaging the under portion of the tire.

The main objects and advantages of the invention are strength, lightness, neatness, simplicity, and cheapness of construction, tight-fitting of the tire, and security against accidental slipping or displacement, as when the vehicle turns a sharp curve, and thus subjects the tires to severe lateral strains, ease and facility of attachment and removal of the tire without the necessity of stretching it over the rim, which not only involves great effort and difficulty, but also is an impediment to tight fitting, and protection of the inflation-valve where a pneumatic tire is used, with provision for convenient connection to a pump at the side of the wheel.

In the accompanying drawings, which form a part of this specification, and wherein corresponding parts in the different figures are designated by similar reference-symbols, Figure 1 is a central vertical cross-section of a wheel embodying the invention. Fig. 2 is a side elevation of the half part of the same.

In Figs. 1 and 2 of the drawings, A denotes the spindle of a vehicle-axle, upon which is journaled the hub B of the wheel. Appropriate ball-bearings are shown in the hub, the outer end of which is provided with a dust-cap of ordinary construction.

The body of the wheel comprises two webs or sections preferably in the form of annular disks C C, which are of course preferably arranged wider apart at the hub and closer at the rim or circumference for the purpose of strength and rigidity, similarly to the arrangement of the spokes of ordinary cycle and sulky wheels. These disks are centrally bolted or secured to the hub, which may have annular collars or flanges $b$ thereon for such attachment, and they are formed at their outer peripheral parts with outwardly-extending concave flanges or half-rims $c$, which together constitute the complete concave rim for reception of the tire D. Each disk is preferably formed from a single piece of sheet-steel and integrally with its half-rim, which results in combined lightness, neatness, and strength. A ring E, preferably of metal, is arranged under the tire between the peripheral straight parts of the disks, and one of the disks, preferably the one at the inner side of the wheel, is riveted or secured to said ring, while the other disk, or that at the outer side of the wheel is separately fastened thereto, so that in use the two disks are rigidly secured together, both at the center or hub and the rim or circumference, while the outer disk may be unfastened and removed when it is desired to place on the tire or repair or remove it. Instead of this means of fastening the disks to the interposed ring E they may be secured thereto by bolts passing through the ring and both disks, though the former mode of attachment is more desirable. This construction makes it a simple and easy matter to attach or remove a thick heavy well-fitting tire, which is very difficult to place onto any of the ordinary vehicle-wheels with present solid rims. With our improved wheel it is only necessary to unfasten and remove the outer disk, fit the tire in its place, fasten it to the ring, and then replace and secure the outer disk, which holds the tire in place and hides and covers the tire-attaching means. Thus the effort and difficulty of stretching the tire over the rim is avoided, the tire can be made tighter, and it is more perfectly insured against accidental slipping or displacement in use.

The tire D is secured to the rim by bolts or cap-screws d, which are inserted through the ring E and tapped into nuts or blocks d', embedded in the tire, thus furnishing efficient means for absolutely preventing the tire from coming off. When the outer disk is removed, the tire can be readily put on and secured to the ring E before returning said outer disk, which hides and protects the bolts.

In order to inflate the pneumatic tire from the outer side of the wheel, the tire has preferably an air-tube F projecting from its under side between the disks and formed with a right-angled terminal f, which generally contains the valve, said terminal projecting into or through a hole in the outer disk C and having a removable cap, so that connection can be made readily with an air-pump set beside the wheel. The tube F may project through an opening in the ring E or said ring may be divided and have it ends terminate at opposite sides of said tube.

G denotes a ring secured over the outer end of the hub and covering the inner periphery of the removable disk. H is a similar ring at the opposite side, having a sprocket I, with which a chain may be geared for driving the wheel independently. If the wheel is merely used for rotation and not as a driving-wheel, or if it is secured on the axle, plain bands or rings similar to G are secured on both sides of the hub.

The metal disks or side plates C C of the wheel may be corrugated radially or in line with the ordinary spokes, as indicated at $c^3$ in Figs. 1 and 2, thus rendering the wheel stiffer.

In addition to the great advantage described in attaching, repairing, or removing the tire a wheel constructed in accordance with our improved design is stronger, neater, and cheaper than any wheel of similar size formed with spokes, it obviates the difficulty of cleaning the spokes of ordinary wheels, and it avoids such accidents as the catching of sticks or stones in the spokes and breaking or injuring the wheel.

We claim as our invention, and desire to secure by Letters Patent of the United States—

1. A wheel having two separable half-rims which together constitute a complete grooved rim, an interposed ring to which said half-rims are secured, at least one of said half-rims being detachably connected to said ring, and a flexible tire fitted in said rim and attached to said ring by fastenings engaging the under portion of the tire.

2. A wheel comprising a hub, two confronting disks attached to said hub and having circumferential flanges or half-rims which together constitute a complete grooved rim for reception of a flexible tire, an interposed ring under said rim to which said disks are secured, at least one disk being detachably connected to its hub and to said ring, and means for fastening the tire to said ring comprising devices adapted for insertion through the ring and for attachment to the under side of the tire.

3. A wheel comprising two confronting sections separably secured together and having outwardly-flaring peripheral flanges or half-rims which when the sections are united constitute the complete grooved or concaved rim for reception of a cushion or flexible tire, and means for positively securing the tire in one half-rim before uniting the sections, the fastenings for the tire being concealed between the sections when united.

4. A wheel comprising two confronting sheet-metal sections having integral circumferential flanges or half-rims which together constitute a complete grooved rim for the reception of a flexible tire, and a ring under the tire between the sections to which the latter are secured, one of said sections being affixed to said ring and the other detachably secured thereto and separable together with its half-rim to permit insertion or removal of the tire, and means for positively securing the tire to said ring before securing the removable section with its half-rim in place, said means comprising bolts or screws inserted through the ring and tapped in ruts embedded in the under medial portion of the tire.

5. A wheel whose body comprises two separable webs or disks having peripheral outwardly-flaring or concave flanges which when the sections are united constitute the complete grooved rim for reception of a flexible tire, a ring between the disks to which they are secured, and means for fastening the tire directly to said ring.

6. A wheel whose body comprises two separable webs or disks and an interposed ring to which they are secured, said disks having peripheral half-rims which together constitute a complete grooved rim, and a pneumatic tire seated in said rim and adapted to be inserted or removed by separating one disk with its half-rim from the other, said tire having a valved inflating-tube projecting from its under side through the ring into the space between the disks and having an opening through one of the disks for connection with a pump.

7. A wheel whose body comprises two separable webs or disks having integral peripheral half-rims which together constitute a complete grooved rim, and a pneumatic tire seated in said rim and adapted to be inserted or removed by separating one disk from the other, a ring under the tire to which said disks are separately secured, one of said disks being detachably secured thereto, and a valved inflating-tube projecting from the under side of said tire between the disks and having an opening through one of the disks for connection with a pump.

8. A wheel comprising a hub having annular flanges, opposite webs or sections secured to said flanges and having circumferential half-rims forming a grooved rim for reception of a flexible tire, and a ring under the tire between the sections and to which they are secured, at least one section being detachable, and means for positively fastening the tire to said ring before securing the detachable section in place.

In testimony whereof we affix our signatures in presence of two witnesses.

EARL A. WHEELER.
WILLIAM HECKERT.

Witnesses:
ALFRED WILLIAMS,
NEULA HECKERT.